United States Patent
Turner et al.

(10) Patent No.: US 6,707,825 B1
(45) Date of Patent: Mar. 16, 2004

(54) SIGNAL PROCESSING SYSTEM

(75) Inventors: Mark A. Turner, Ijamsville, MD (US); Joseph E. Anstett, III, Gaithersburg, MD (US); Negar Moshiri, Bethesda, MD (US); Daniel S. Simpkins, Bethesda, MD (US); Carl Symborski, Olney, MD (US)

(73) Assignee: Salix Technologies, Inc., Gaithersburg, MD (US)

( * ) Notice: Subject to any disclaimer, the term of this patent is extended or adjusted under 35 U.S.C. 154(b) by 0 days.

(21) Appl. No.: 09/207,746

(22) Filed: Dec. 8, 1998

(51) Int. Cl.[7] .................................................. H04J 3/16
(52) U.S. Cl. ...................... 370/467; 370/352
(58) Field of Search ................................. 370/230, 352, 370/351, 357, 400, 401, 402, 465, 395, 466, 467, 464, 468, 469, 474

(56) References Cited

U.S. PATENT DOCUMENTS

| | | | |
|---|---|---|---|
| 4,726,019 A | * 2/1988 | Adelmann et al. | 370/474 |
| 5,008,878 A | 4/1991 | Ahmadi et al. | |
| 5,119,370 A | 6/1992 | Terry | |
| 5,379,293 A | * 1/1995 | Kanno et al. | 370/389 |
| 5,384,807 A | * 1/1995 | Yatim et al. | 375/244 |
| 5,410,754 A | * 4/1995 | Klotzbach et al. | 370/466 |
| 5,757,871 A | * 5/1998 | Furukawa et al. | 375/372 |
| 5,940,479 A | * 8/1999 | Guy et al. | 379/93.01 |
| 6,049,543 A | * 4/2000 | Sauer et al. | 370/395 |
| 6,111,880 A | * 8/2000 | Rusu et al. | 370/395 |
| 6,147,988 A | * 11/2000 | Bartholomew et al. | 370/352 |
| 6,169,750 B1 | * 1/2001 | Tomono et al. | 370/474 |
| 6,172,978 B1 | * 1/2001 | Fushimi et al. | 370/395 |
| 6,198,738 B1 | * 3/2001 | Chang et al. | 370/352 |
| 6,229,788 B1 | * 5/2001 | Graves et al. | 370/230 |
| 6,269,095 B1 | * 7/2001 | Neubauer et al. | 370/352 |

FOREIGN PATENT DOCUMENTS

| | | |
|---|---|---|
| EP | 0 312 628 | 4/1989 |
| EP | 0 345 891 | 12/1989 |
| EP | 0 664 657 A2 | 7/1995 |
| GB | 2 291 562 A | 1/1996 |

OTHER PUBLICATIONS

Eric Bear, "Designing an Embedded Voice over Packet Network Gateway," Communication Systems Design, pp. 21–17 (Oct. 1998).

"Fusion™ IP Telephony Development Platform," Natural Micro–Systems, Framingham, Massachusetts.

"The Alliance Generation®–8/80 Board (AG–8/80)," Natural Microsystems, Framingham, Massachusetts.

(List continued on next page.)

*Primary Examiner*—Dang Ton
*Assistant Examiner*—Phuc Tran
(74) *Attorney, Agent, or Firm*—Venable LLP; Michael A. Sartori

(57) ABSTRACT

A transcoder converts data between a telephony data format and a packet data format. The transcoder comprises: a digital logic telephony data engine receiving telephony data for the transcoder and transmitting telephony data for the transcoder, the digital logic telephony data engine comprising a frame accumulation buffer; a digital logic packet engine receiving packet data for the transcoder and transmitting packet data for the transcoder; a digital signal processing complex coupled to the digital logic telephony data engine and the digital logic packet engine, the digital signal processing complex comprising an array of digital signal processors; and a host processor coupled to the digital logic telephony data engine and the digital logic packet engine, wherein the digital logic telephony data engine, the digital logic packet engine, and the digital signal processing complex perform media channel processing, wherein the host processor performs control channel processing.

20 Claims, 6 Drawing Sheets

OTHER PUBLICATIONS

"The Alliance Generation®–T1 Board (AG–T1)," Natural Microsystems, Framingham, Massachusetts.*

"VocalTec Telephone Gateway™, Worldwide Communications Solutions," VocalTec Communications Ltd., Herzliya, Israel, 1998.*

Gard I et al: "Supporting STM Traffic with ATM—A Switch Implementation" Proceedings of the International Switching Symposium, DE, Berlin, VDE Verlag, Apr. 23, 1995, vol. SYMP. 15, pp. 62–66.

* cited by examiner

SIGNAL PROCESSING SYSTEM

BACKGROUND OF THE INVENTION

1. Field of the Invention

The invention relates to switching of both telephony data and packet data within a telecommunication switching system, and to converting data between a telephony data format and a packet data format.

2. Discussion of the Prior Art

FIG. 1 illustrates a plan view of a prior art system for converting data between a telephony data format and a packet data format. A microprocessor 1 running appropriate software converts data from pulse-coded modulation (PCM) data format to Internet protocol (IP) data format. This prior art system is slow and processes a limited number of calls because of all of the functions of converting the data performed in software.

FIG. 2 illustrates a plan view of a prior art system for converting data between telephony and packet data formats. The system comprises a microprocessor 1 and a digital signal processor (DSP) 2. The coder-decoder (CODEC) function of the conversion routine is no longer performed by the microprocessor 1, as in FIG. 1, and is instead performed by the DSP 2. The DSP 2 converts data between PCM data format and packet data format. Running appropriate software, the microprocessor 1 converts data from packet data format to IP data format. Although this prior art system is faster than the prior art system of FIG. 1, this prior art system suffers from an inability to handle a significantly large number of telephone calls. The conventional prior art system is discussed in Eric Baer, "Designing an Embedded Voice over Packet Network Gateway," Communication Systems Design, pp. 21–27, Oct. 1998. Conventional prior art systems offered for sale include: the Alliance Generation-8/80 Board (AG-8/80) by Natural MicroSystems of Framingham, Mass., which can only handle eight voice channels; the Alliance Generation-T1 Board (AG-T1) by Natural MicroSystems of Framingham, Mass., which can only handle twenty-four voice channels; the Fusion IP Telephony Development Platform by Natural MicroSystems of Framingham, Mass., which can only handle eight voice channels; and the VocalTec Telephony Gateway by VocalTec Communications Ltd. of Herzliya, Israel, which can only handle twenty-four voice channels.

SUMMARY OF THE INVENTION

An object of the invention is to provide a telecommunication system for interfacing between a telephone network and packet data network.

An object of the invention is to provide a transcoder for converting data between a telephony data format and a packet data format.

An object of the invention is to provide telephony-to-packet data format conversion and packet-to-telephony data format conversion having low jitter and low latency.

An object of the invention is to provide a single transcoder board capable of processing a large number of channels, such as over a thousand channels.

The invention includes an a transcoder for converting data between a telephony data format and a packet data format. The transcoder comprises: a digital logic telephony data engine receiving telephony data for the transcoder and transmitting telephony data for the transcoder, the digital logic telephony data engine including a frame accumulation buffer; a digital logic packet engine receiving packet data for the transcoder and transmitting packet data for the transcoder; a digital signal processing complex coupled to the digital logic telephony data engine and the digital logic packet engine, the digital signal processing complex comprising an array of digital signal processors; and a host processor coupled to the digital logic telephony data engine and the digital logic packet engine, wherein the digital logic telephony data engine, the digital logic packet engine, and the digital signal processing complex perform media channel processing, wherein the host processor performs control channel processing.

The invention includes a system for connecting a telephone network and a packet network. The system comprises: a hybrid switch coupled to the telephone and packet networks switching data between the telephone and packet networks; and at least one transcoder coupled to the hybrid switch converting data between a telephony data format used by the telephone network and a packet data format used by the packet network.

The invention includes a method for converting data between a telephony data format and a packet data format. The method comprises: converting data from the telephony data format to the packet data format; and converting data from the packet data format to the telephony data format.

For the method, converting data from the telephony data format to the packet data format comprises: receiving data in the telephony data format; accumulating in digital logic hardware the data to obtain a telephony data frame; selecting in digital logic hardware a digital signal processor from an array of digital signal processors; passing the telephony data frame to the selected digital signal processor; transcoding in the selected digital signal processor the telephony data frame to obtain a coder-decoder data frame; and encapsulating in the selected digital signal processor the coder-decoder data frame to obtain data in the packet data format.

For the method, converting data from the packet data format to the telephony data format comprises: receiving data in the packet data format; accumulating in digital logic hardware the data to obtain a packet data frame; resequencing in digital logic hardware the packet data frame to obtain a coder-decoder data frame; selecting in digital logic hardware a digital signal processor from an array of digital signal processors; passing the coder-decoder data frame to the selected digital signal processor; decoding in the selected digital signal processor the coder-decoder frame to obtain a telephony data frame; passing the telephony data frame to digital logic hardware; and encapsulating in digital logic hardware the telephony data frame to obtain data in the telephony data format.

Moreover, the above objects and advantages of the invention are illustrative, and not exhaustive, of those which can be achieved by the invention. Thus, these and other objects and advantages of the invention will be apparent from the description herein or can be learned from practicing the invention, both as embodied herein and as modified in view of any variations which may be apparent to those skilled in the art.

BRIEF DESCRIPTION OF THE DRAWINGS

Embodiments of the invention are explained in greater detail by way of the drawings, where the same reference numerals refer to the same features.

DESCRIPTION OF THE INVENTION

Figure 1:
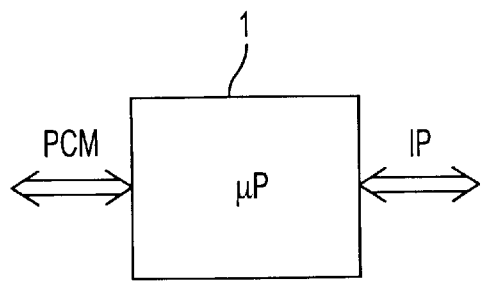
FIG. 1 illustrates a plan view of a prior art system for converting data between telephony and packet data formats.
Figure 2:
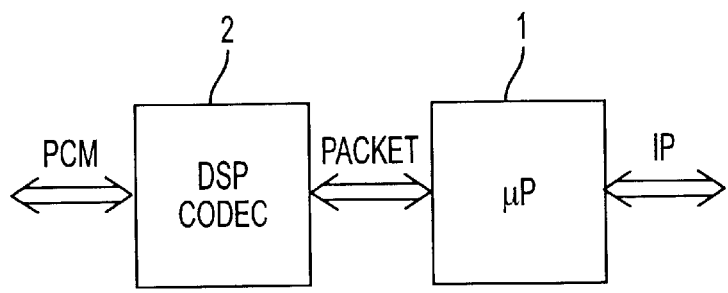
FIG. 2 illustrates a plan view of a prior art system for converting data between telephony and packet data formats.
Figure 3:
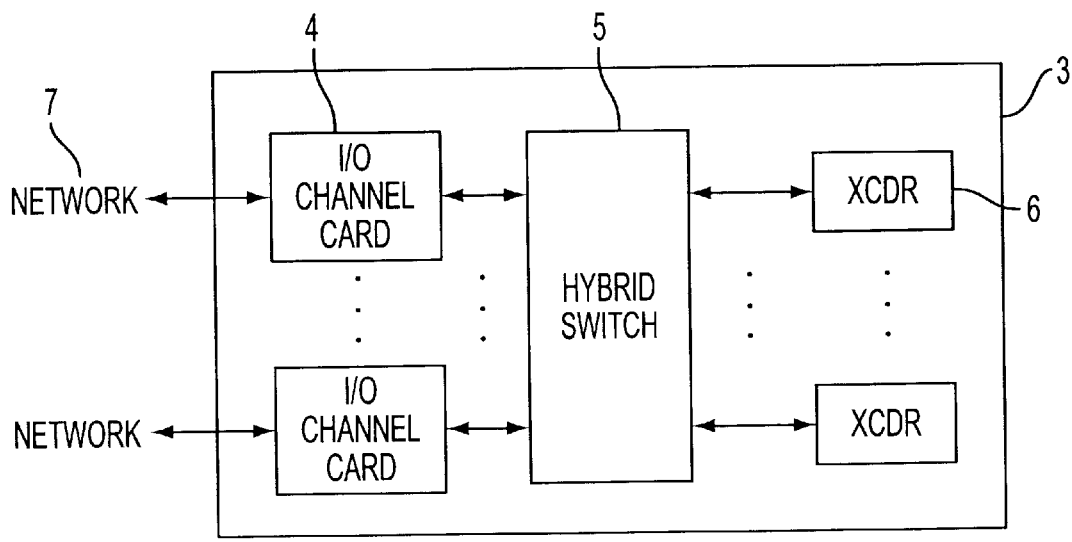
FIG. 3 illustrates a plan view of a signal processing system of the invention.

FIG. 3 illustrates a plan view of a signal processing system of the invention. The signal processing system 3 comprises input/output (I/O) channel cards 4, a hybrid switch 5, and transcoders (XCDRs) 6.

The system depicted in FIG. 3 is used to connect a telephony network to a packet network for the purpose of transporting telephony data, which is typically transported over a TDM network, over the packet network. Examples of such telephony data include, but are not limited to, voice telephone calls, facsimile (fax) transmission sessions, and data (modem) transmission sessions. Here, the "forward" direction of data transmission shall be considered to be from the TDM network to the packet network, and the "reverse" direction of data transmission shall be considered to be from the packet network to the TDM network.

In the forward direction, a TDM network 7 is terminated at an I/O channel card 4. PCM data from the TDM network is extracted by the I/O channel card 4 and sent to the hybrid switch 5. The hybrid switch 5 uses its TDM switching functionality to transfer the PCM data to one or more transcoder (XCDR) cards 6. On the XCDR card 6, the PCM data is converted to packet data using one or more conventional conversion algorithms, depending on the type of information (voice, fax, or data) represented by the PCM data. This packet data is then sent back from the XCDR card 6 to the hybrid switch 5. The hybrid switch 5 uses its packet switching functionality to transfer the packet data to one or more I/O channel cards 4. The I/O channel cards 4, which receive the packet data from the hybrid switch 5, transmit the packet data on a packet network 7.

In the reverse direction, packets from a packet network 7 are terminated by an I/O channel card 4 and sent to the hybrid switch 5. The hybrid switch 5 uses its packet switching functionality to transfer the packet to one or more XCDR cards 6. On the XCDR card 6, the packet data is converted back to PCM data using one or more conventional conversion algorithms, depending on the type of information (voice, fax, or data) represented by the packet data. The PCM data is then sent back from the XCDR card 6 to the hybrid switch 5. The hybrid switch 5 uses its TDM switching functionality to transfer the PCM data to one or more I/O channel cards 4. The I/O channel cards 4, which receive the PCM data from the hybrid switch 5, transmit the PCM data on a TDM network 7.

A single I/O channel card 4 can be constructed to connect to a TDM network 7, a packet network 7, or a TDM network 7 and a packet network 7.

The I/O channel cards 4 connect the system 3 to various networks 7. The networks 7 can include both telephone networks, such as the public switch telephone network (PSTN), and packet networks, such as the Internet. Depending on the number of channels desired and on the channel density of input/output I/O channel cards available, one or more I/O channel cards 4 physically connect the system 3 to the networks 7. Each I/O channel card 4 performs pre-processing on incoming data from the corresponding network 7 and prepares data for input to the hybrid switch 5. Each I/O channel card 4 also performs post-processing on data arriving from the hybrid switch 5 before passing the data to the outbound transmission facility on the corresponding network 7.

The hybrid switch 5 is coupled to each of the I/O channel cards 4, and switches both telephony data and packet data. The hybrid switch 5 can be implemented with a conventional hybrid switch such as discussed in: Myron J. Ross, "Circuit versus Packet Switching," chapter in "Fundamentals of Digital Switching" (John C. McDonald, ed.), Plenum Press, 1983.

The hybrid switch 5 can also be implemented using the hybrid switching technique described in co-pending U.S. patent application Ser. No. 09/207,745, filed Dec. 8, 1998, entitled "Hybrid Switching."

The XCDRs 6 are each coupled to the hybrid switch 5 and each converts data between a telephony data format and a packet data format.

Figure 4:
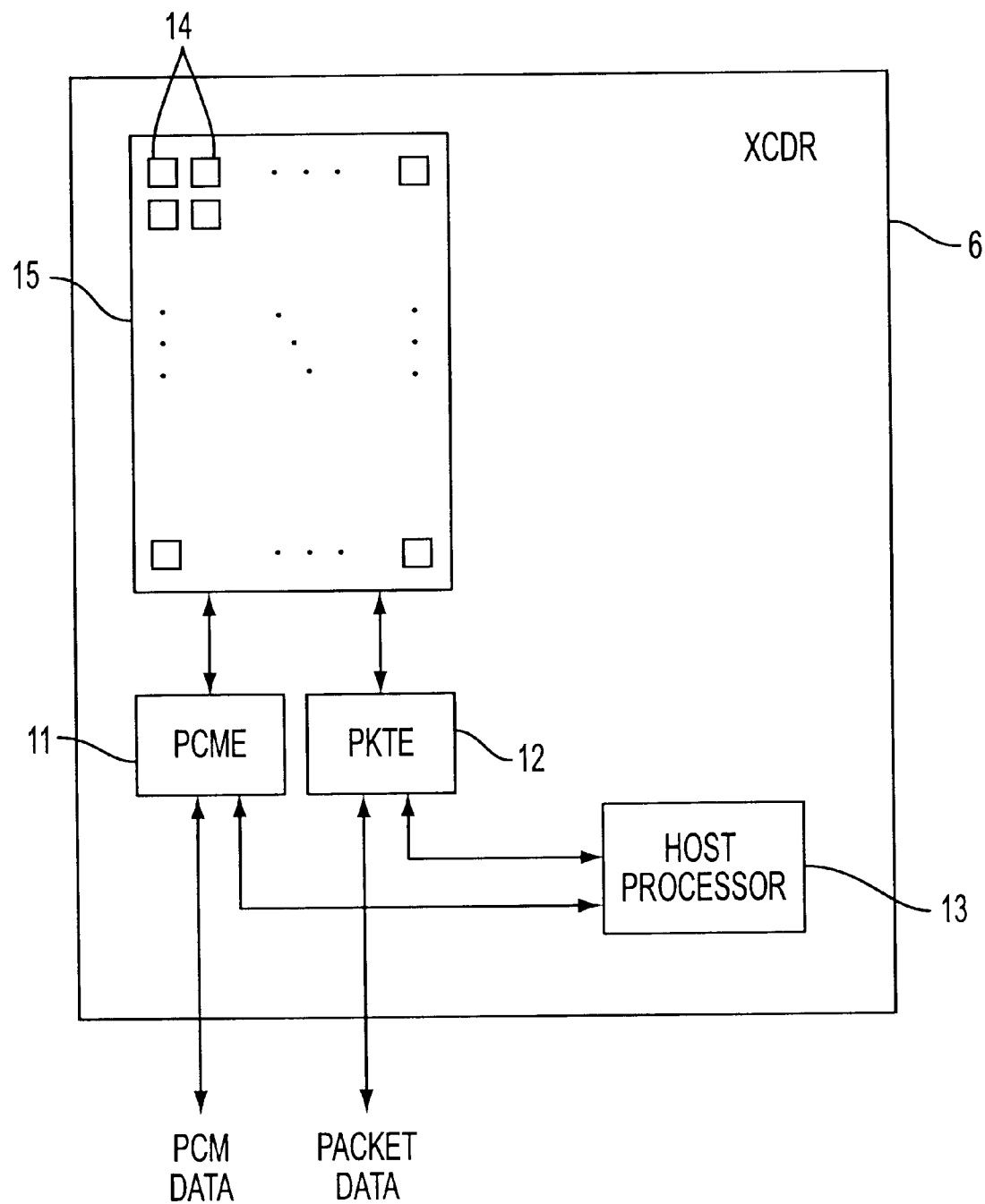
FIG. 4 illustrates a plan view of the XCDR of FIG. 3.

FIG. 4 illustrates a plan view of the XCDR 6 of FIG. 3. The XCDR 6 includes a two-dimensional array of DSPs 14, called the DSP complex (DSPC) 15, a PCM data engine (PCME) 11, a packet data engine (PKTE) 12, and a host processor 13. Although FIG. 4 describes the XDCR 6 using the PCM data format, the invention can be practiced using any telephony data format.

To convert the PCM data to packet data, the XCDR 6 receives PCM data from the hybrid switch 5 into the PCME 11. The PCME 11 routes the PCM data to the appropriate DSP 14 within the DSPC 15. The DSP 14 performs the conversion, and sends the newly created packet to the PKTE 12. The PKTE 12 then completes assembly of the data packets according to the specific packet protocols being implemented and transmits the data back to the hybrid switch 5 for packet switching to one or more I/O channel cards 4 and eventual transmission on the packet network. The PKTE 12 can also accept control channel information from the host processor 13 and insert these into the outbound packet flow.

To convert packet data to PCM data, the XCDR 6 receives the packet data from the hybrid switch 5 into the PKTE 12. The PKTE 12 separates media channel (i.e., telephony) packets from control channel packets and sends the control channel packets to the host processor 13 for processing by the software running on the host processor 13. The media channel packets are sent to the appropriate DSP 14 within the DSPC 5, where they are converted back to PCM data and sent to the PCME 11. The PCME 11 then transmits the PCM data back to the hybrid switch 5 for TDM switching to one or more I/O channel cards 4 and eventual transmission on the telephone network.

The invention is able to achieve signal processing on a large number of channels, on the order of more than a thousand, by separating the media and control channel paths and accelerating the media channel processing with the PCME 11 and PKTE 12 digital logic hardware, and by supporting a large number of DSPs 14 in a two-dimensional array within the DSPC 15.

The DSPC 15 includes a two-dimensional array of DSPs 14. The DSPs 14 are connected together by rows and columns, and each DSP 14 can be addressed by its row and column address.

The PCME 11 and the PKTE 12 are implemented using digital logic hardware. The host processor is implemented using at least one microprocessor or microcontroller running appropriate software.

Each of the components of the XCDR 6 of FIG. 4 is further discussed in relation to an exemplary implementation. In the exemplary implementation, the telephony data is in the PCM data format, and the packet data is in the Internet Protocol data format. The exemplary implementation is able to convert 1024 channels of data between the PCM data format and the IP data format. This exemplary implementation, as well as the other examples discussed herein, are non-limiting examples.

Figure 5:
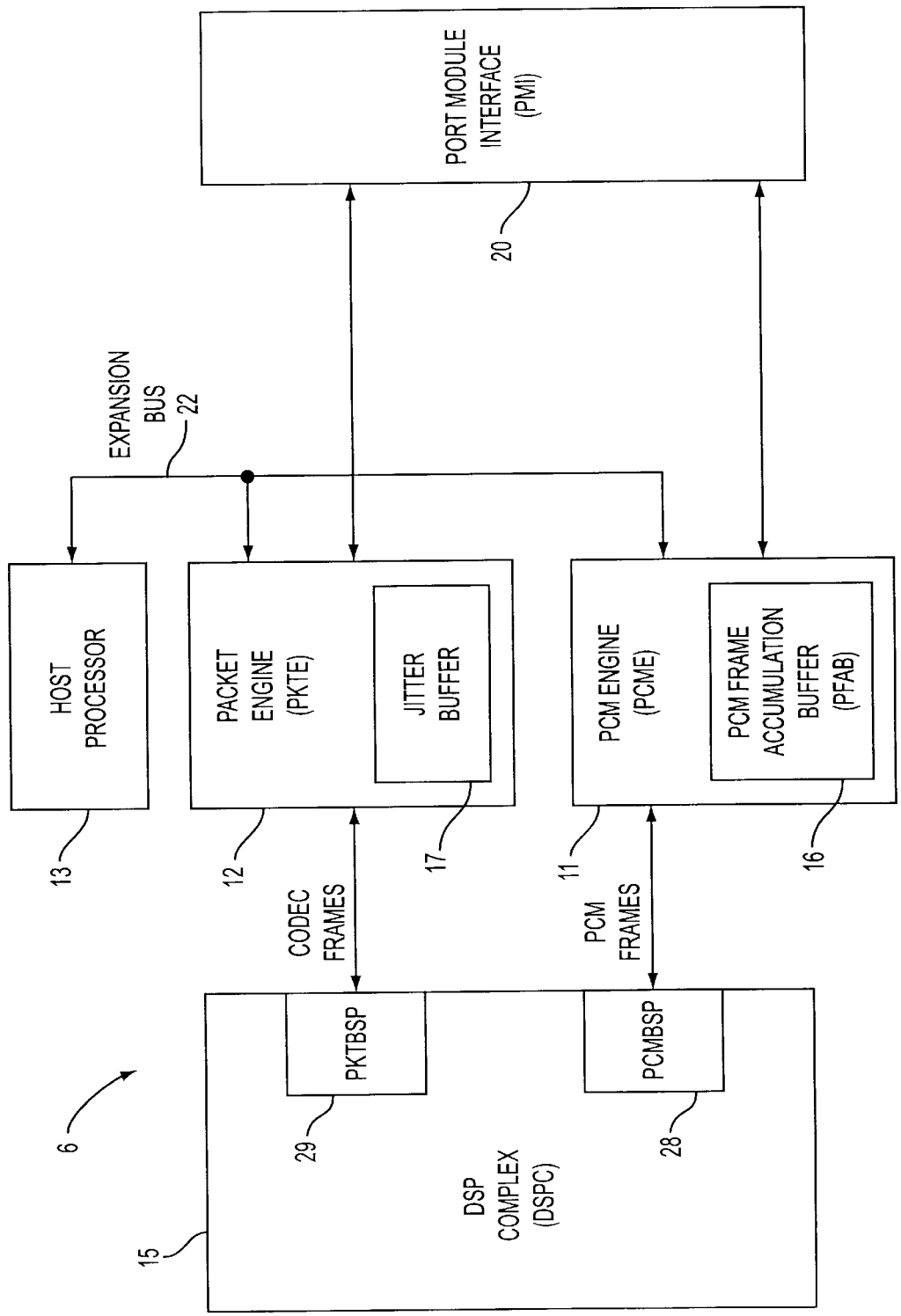
FIG. 5 illustrates a plan view of an XCDR for the exemplary implementation of the invention.

FIG. 5 illustrates a plan view of a transcoder for the exemplary implementation of the invention. The XCDR 6 includes: the DSPC 15, which includes the array of DSPs 14 (not shown); the PCME 11, which includes a PCM frame accumulation buffer (PFAB) 16; the PKTE 12, which includes a jitter buffer 17; and the host processor 13. The XCDR 6 interfaces with the hybrid switch 5 via the port module interface (PMI) 20. The XCDR 6 is implemented on a single integrated circuit board.

The XCDR 6 provides two flow paths: a media channel processing path and a control channel processing path. The media channel processing path is faster than the control channel processing path. The media channel processing path is handled primarily by hardware, and the host processor 13 handles the processing for the control channel processing path.

The host processor 13 performs the majority of the control and status functions as well as some of the packet encapsulation/de-encapsulation and packet interface functions for the control channel processing path. The host processor 13 coordinates the overall operation of the XCDR 6 and monitors and maintains packet protocol session on the XCDR 6. Examples of packet protocols include, but are not limited to, the real-time transport protocol (RTP) and the real-time transport control protocol (RTCP). The host processor 13 exchanges control and status information with the PKTE 12 and PCME 11 via an on-board expansion bus 22. The host processor 13 exchanges control and status information with the DSPC 15 via the PKTE 12.

The PKTE 12 performs a portion of the packet interface functions and the packet encapsulation/de-encapsulation functions. The PKTE 12 is the conduit for which the host processor 13 and the DSPC 15 can exchange CODEC frames and control and status information. More specifically, the PKTE 12 receives input packet data units from the hybrid switch 5 and either sends the input data units to the microprocessor complexes 18, 19 or processes the input data units itself. All non-media channel traffic is sent to the host processor 13, and all media channel traffic is processed by the PKTE 12. The media channel traffic processing consists of validating the packet and placing its payload in the jitter buffer 17. The PKTE 12 maintains a jitter buffer for each channel. The PKTE 12 transfers CODEC frames from the jitter buffer 17 to the DSPC 15. The PKTE 12 receives media channel packets from the DSPC 15 and transmits them over the PMI 20 to the hybrid switch 5. Finally, the PKTE 12 transfers software code and control and status information between the host processor 13 and the DSPC 15.

The jitter buffer 17 stores received media channel payloads (e.g., CODEC frames) until they are needed by the DSPC 15. The jitter buffer 17 consists of many individual jitter buffers. There is one individual jitter buffer for each channel. Each individual jitter buffer is configurable on a per channel basis. The jitter buffer 17 absorbs and smooths the variations in inter-arrival time of packets received from the packet network 7.

Alternatively, the jitter buffer 17 can be implemented in the DSPC 15.

The DSPC 15 performs all of the transcoding functions as well as some of the encapsulation functions and packet interface functions. In one direction to convert data from the PCM data to the packet data format, the DSPC 15 receives PCM frames from the PCME 11, encodes them, encapsulates them into media channel packets and sends them to the PKTE 12. In the reverse direction to convert data from the packet data format to the PCM data format, the DSPC 15 receives CODEC frames from the PKTE 12, decodes them, and sends them to the PCME 11.

The PCME 11 performs all of the PCM interface functions. The PCME 11 receives PCM samples from the PMI and accumulates the samples into PCM frames in the PFAB 16. The PCME 11 transfers PCM frames between the PFAB 16 and the DSPC 15. The PCME 11 segments PCM frames and transfers them over the PMI 20.

The PFAB 16 is a memory buffer and provides storage for PCM frames.

The functions and inter-operation of the components of the XCDR 6 in FIG. 5 are next described by following the flow path of a telephone channel through the XCDR 6.

To convert data from the PCM data to the packet data format, PCM samples are received by the PCME 11 from the PMI 20, and the PCME 11 stores the PCM samples in the PFAB 16. When an entire PCM frame has been accumulated, the PCME 11 transfers the frame to the DSPC 15. The DSPC 15 then performs and encodes the frame using appropriate CODEC algorithms. Completed frames are then encapsulated into media channel packets and sent to the PKTE 12. The PKTE 12 transmits the media packets over the PMI 20.

To convert data from the packet data format to the PCM data format, the PKTE 12 receives packets over the PMI 20 and reassembles them into media channel packets. The PKTE 12 then validates the packet header information and sends it to the host processor 13 for use in statistics calculations. Next, the PKTE 12 resequences the media channel payload and places it in the individual jitter buffer of the jitter buffer 17 appropriate to the channel. At a periodic interval, the PKTE 12 removes a CODEC frame from the individual jitter buffer and sends it to the DSPC 15. Next, the DSPC 15 decodes the CODEC frame and produces a PCM frame. The DSPC 15 then sends the frame to the PCME 11. Finally, the PCME 11 transmits the PCM frame over the PMI 20.

The DSPC 15, the PATE 12, the PCME 11, and the host processor 13 are next discussed further in depth.

Figure 6:
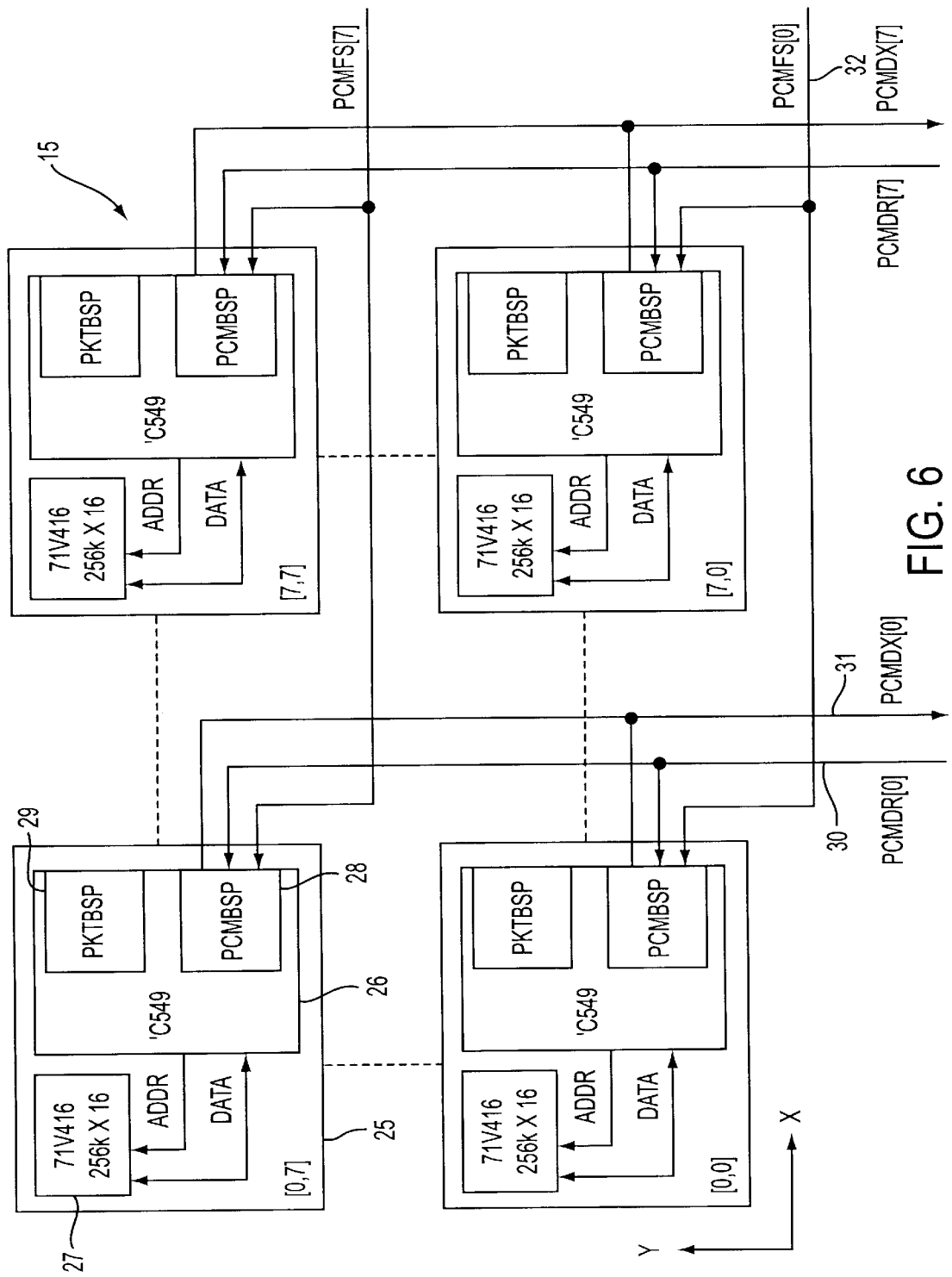
FIG. 6 illustrates a plan view of the DSPC of FIG. 5.

FIG. 6 illustrates a plan view of the DSPC 15 of FIG. 5 using an 8×8 DSP array 11 of 64 DSP arrays. Each of the 64 sub-complexes 25 contains a DSP 26 and a memory 27. For the example, the DSP 26 is a TMS320VC549 DSP manufactured by Texas Instruments Inc. of Dallas, Tex., and the memory 27 is an IDT71V416 256k×16 asynchronous SRAM manufactured by Integrated Device Technology of Santa Clara, Calif.

The individual DSP 26 is identified by its coordinates on the x-y grid. For example, the DSP 26 in the lower left corner is DSP(0,0), and the DSP 26 in the upper right corner is DSP(7,7).

All communications with the DSPC 15 are handled via the two buffered serial ports (BSP's) on each of the DSP 26. BSP0 is designated as the PCMBSP interface 28 and is connected to the PCME 11, and BSP1 is designated as the PKTBSP interface 29 and is connected to the PKTE 12. The BSP's are connected to the PCME 11 and the PKTE 12 such that the number of inputs and outputs to the PCME 11 and the PKTE 12 is as small as possible without overloading any one signal.

The interconnect scheme for the PCMBSP interfaces 28 is illustrated in FIG. 6. The interconnect scheme for the PKTBSP interfaces 29 is identical to the interconnect scheme for the PCMBSP interfaces 28 and is omitted for clarity. Each column of DSP 26 shares a common receive data line PCMDR 30 and a common transmit data line PCMDX 31. Each row of the DSP 26 shares a common frame sync line PCMFS 32. All the BSP's in a single row are operated concurrently based on the same frame sync signal, and all 64 DSP 26 can be accessed by accessing each row in turn. For this example of 64 DSP chips 26, this interconnect scheme requires only 24 I/O's to the PCME 11.

In order for all the BSP's in a given row to operate from a common frame sync pulse on PCMFS 32, the BSP's all use a common buffer size and a common data transfer format. The format used to transfer data is a DSPC frame. There are two types of DSPC frames: PCM frames and PKTBSP frames. PCM frames are used over the PCMBSP interface 28, and PKTBSP frames are used over the PKTBSP interface 29.

The PKTE 12 performs the following functions: receives packet traffic from the hybrid switch 5; separates input media channel traffic from control channel processing path traffic, where the PKTE 12 processes the media channel traffic, and the control channel traffic is sent to the host processor 13 for processing; for received media channel traffic, performs header validation checks, and buffers and time stamps packet headers for eventual transfer to the host processor 13; drops packets not meeting acceptance criteria; resequences and queues media channel packet payloads into individual jitters buffers; dequeues CODEC frames from individual jitter buffers and transfers the CODEC frames to the DSPC 15 on a periodic basis; maintains an individual jitter buffer for each channel; reports individual jitter buffer underflows and overflows to the host processor 13; receives packets from the DSPC 15 and transmits them over the PMI 20; transfers control and status information between the host processor 13 and the DSPC 15; and receives packets from the host processor 13 and transmits them over the PMI 20.

Figure 7:
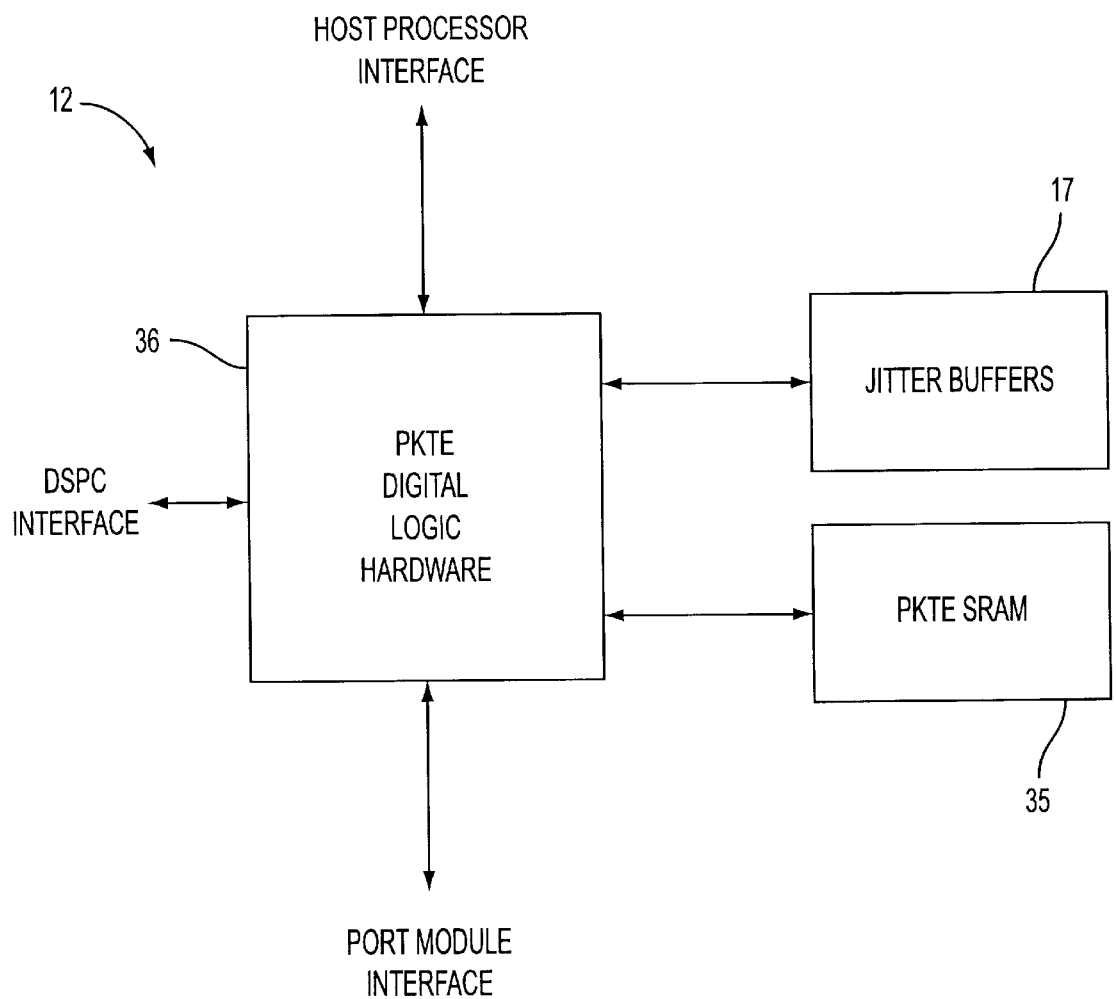
FIG. 7 illustrates a plan view of the PKTE of FIG. 5.

FIG. 7 illustrates a plan view of the PKTE 12 for the exemplary implementation of FIG. 5 The PKTE 12 includes three components; the jitter buffer 17; a PKTE SRAM 35; and the PKTE digital logic hardware 36. The jitter buffer 17 provides temporary storage of received packet payloads (i.e., CODEC frames). The PKTE SRAM 35 stores the per channel information needed to perform packet processing and maintains the jitter buffers. The PKTE SRAM 35 also provides temporary storage for packet headers and other information that is passed to the host processor 13. The PKTE digital logic hardware 36 controls, coordinates, and implements the operation of the PKTE. The PKTE digital logic hardware 36 communicates with the host processor 13 and with the DSPC 15.

The memory device used to implement the jitter buffer 17 is the IDT71V547S100PF 128k×36 synchronous SRAM, made by Integrated Device Technology (IDT) of Santa Clara, Calif. The same device is used to implement the PKTE SRAM 35. The PKTE digital logic hardware 36 is implemented in an XC4044XL field programmable gate array (FPGA) made by Xilinx, Inc. of San Jose, Calif.

The implementation of the PKTE 12 is not limited to the devices used in the exemplary system. Any memory devices can be used in place of the IDT SRAMs, and any digital logic technology can be used in place of the Xilinx FPGA. Examples of the latter include, but are not limited to, application specific integrated circuits (ASICs), competitive FPGAs including, but not limited to, devices from Altera Corporation of San Jose, Calif., Lattice Semiconductor Corporation of Hillsboro, Oreg., and Vantis Corporation of Sunnyvale, Calif., and discrete logic implementations.

The PCME 11 performs PCM interface functions and a variety of other tasks necessary to support these main functions as well as inter-operate with other parts of the XCDR 6. With reference the exemplary embodiment, the PCME 11 performs the following functions: receives PCM samples from the hybrid switch 5; selects up to 1024 telephony channels for transcoding; accumulates PCM frame payloads in the PFAB; transmits PCM frames to the DSPC 15; receives PCM frames from the DSPC 15; generates time stamps; and transmits the PCM frames to the hybrid switch 5.

Figure 8:
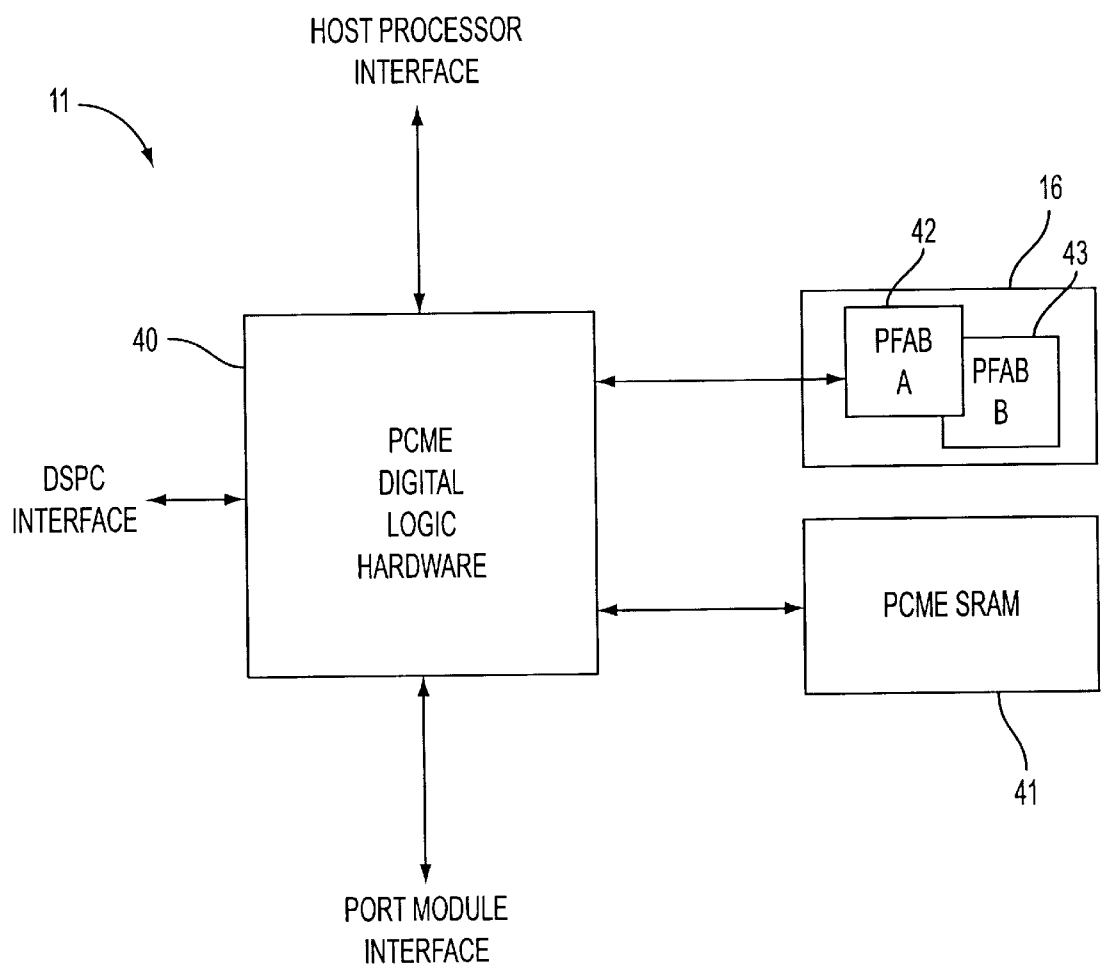
FIG. 8 illustrates a plan view of the PCME of FIG. 5

FIG. 8 illustrates a plan view of the PCME 11 for the exemplary implementation of FIG. 5. The PCME 11 includes three components: the PCME digital logic hardware 40, a PCME SRAM 41, and the PFAB memory 16, which includes a first PFAB memory (PFABA) 42 and a second PFAB memory (PFABB) 43.

The PCME 40 performs the control, synchronization, and interfacing functions of the PCME 11. The memory 41 stores a lookup table that identifies which telephony channels are being processed by the XCDR 6. The PFABA 42 and PFABB 43 are dual-port memories used to accumulated individual PCM samples into PCM frames.

The memory devices used to implement the PFABA 42 and PFABB 43 are the IDT70V9089 64k×8 synchronous dual-port SRAM, made by Integrated Device Technology of Santa Clara, Calif. The memory device used to implement the PCME SRAM 41 is the IDT71V433 32k×32 synchronous SRAM made by Integrated Device Technology of Santa Clara, Calif. The PCME digital logic hardware 40 is implemented in an XC4028XL field programmable gate array (FPGA) made by Xilinx, Inc. of San Jose, Calif.

The implementation of the PCME 11 is not limited to the devices used in the exemplary system. Any memory devices can be used in place of the IDT SRAM devices, and any digital logic technology can be used in place of the Xilinx FPGA. Examples of the latter include, but are not limited to, application specific integrated circuits (ASICs), competitive FPGAs including, but not limited to, devices form Altera Corporation of San Jose, Calif., Lattice Semiconductor Corporation of Hillsboro, Oreg., and Vantis Corporation of Sunnyvale, Calif., and discrete logic implementations.

The host processor 13 performs the functions in the control channel processing path. Specifically, the host processor 13 performs the following functions: collecting media statistics; generating control packets; receiving control packets; configuring the DSPC 15; performing status maintenance for the DSPC 15; and configuring the PCME 11 and the PKTE 12.

For the exemplary embodiment, the host processor 13 is implemented with the IDT79RV4700 microprocessor manufactured by Integrated Device Technology of Santa Clara, Calif. The host processor 13 can also be implemented with one or more microprocessors or microcontrollers, such as the Pentium II microprocessor manufactured by Intel of Santa Clara, Calif., the 68360 microprocessor manufactured by Motorola of Schaumburg, Ill., and the i960 microcontroller manufactured by Intel of Santa Clara, Calif.

The invention can be used with various types of telephony data, TDM data, and packet data. The telephony data, for example, can be PCM data. The TDM data, for example, can be any of the following TDM data types: synchronous optical network (SONET), synchronous digital hierarchy (SDH), T3, T1, E3, and E1. The packet data, for example, can be any of the following packet data types: asynchronous transfer mode (ATM), Internet protocol (IP), frame relay, and X25. These examples, as well as the other examples discussed herein, are non-limiting examples. For instance, there are currently other TDM data types available, and numerous other packet data types available. These other current TDM and packet data types can be used with the invention, and other telephony, TDM, and packet data types to be developed to accommodate communication needs can likewise be used with the invention.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A transcoder for converting data between a telephony data format and a packet data format, comprising:
    a digital logic telephony data engine receiving telephony data for said transcoder and transmitting telephony data for said transcoder, said digital logic telephony data engine comprising a frame accumulation buffer;
    a digital logic packet engine receiving packet data for said transcoder and transmitting packet data for said transcoder;
    a digital signal processing complex coupled to said digital logic telephony data engine and said digital logic packet engine, said digital signal processing complex comprising an array of digital signal processors; and
    a host processor coupled to said digital logic telephony data engine and said digital logic packet engine, wherein said digital logic telephony data engine, said digital logic packet engine, and said digital signal processing complex separate media channels from control channels in input data, route the control channels to the host processor, and perform media channel processing, wherein said host processor performs control channel processing;
    wherein data is converted from the packet data format to the telephony data format by removing jitter from a coder-decoder data frame, said coder-decoder data frame based on said packet data.

2. A transcoder as claimed in claim 1, wherein the digital logic packet engine further comprises a jitter buffer.

3. A transcoder as claimed in claim 1, wherein the digital signal processing complex further comprises a jitter buffer.

4. A transcoder as claimed in claim 1, wherein said array is a two-dimensional array, wherein said two-dimensional array comprises a plurality of rows of digital signal processors and a plurality of columns of digital signal processors.

5. A system for connecting a telephone network and a packet network, comprising:
    a hybrid switch coupled to said telephone and packet networks switching data between said telephone and packet networks; and
    at least one transcoder coupled to said hybrid switch converting data between a telephony data format used by said telephone network and a packet data format used by said packet network, each said transcoder comprising:
        a digital logic telephony data engine receiving telephony data for said transcoder and transmitting telephony data for said transcoder, said digital logic telephony data engine comprising a frame accumulation buffer;
        a digital logic packet engine receiving packet data for said transcoder and transmitting packet data for said transcoder;
        a digital signal processing complex coupled to said digital logic telephony data engine and said digital logic packet engine, said digital signal processing complex comprising an array of digital signal processors; and
        a host processor coupled to said digital logic telephony data engine and said digital logic packet engine, wherein said digital logic telephony data engine, said digital logic packet engine, and said digital signal processing complex separate media channels from control channels in input data, route the control channels to the host processor, and perform media channel processing, wherein said host processor performs control channel processing;
    wherein data is converted from the packet data format to the telephony data format by removing jitter from a coder-decoder data frame, said coder-decoder data frame based on said packet data.

6. A system as claimed in claim 5, further comprising:
    at least one input/output channel card coupling said hybrid switch to said telephone and packet networks.

7. A transcoder as claimed in claim 5, wherein said array is a two-dimensional array, wherein said two-dimensional array comprises a plurality of rows of digital signal processors and a plurality of columns of digital signal processors.

8. A system as claimed in claim 5, further comprising:
    at least one input/output channel card coupling said hybrid switch to said telephone and packet networks.

9. A transcoder as claimed in claim 5, wherein said array is a two-dimensional array, wherein said two-dimensional array comprises a plurality of rows of digital signal processors and a plurality of columns of digital signal processors.

10. A method for converting data between a telephony data format and a packet data format, comprising the steps of:
    converting data from the telephony data format to the packet data format, comprising the steps of:
    receiving data in the telephony data format;
    accumulating in digital logic hardware the data to obtain a telephony data frame;
    selecting in digital logic hardware a digital signal processor from an array of digital signal processors;
    passing the telephony data frame to the selected digital signal processor;
    transcoding in the selected digital signal processor the telephony data frame to obtain a coder-decoder data frame; and
    encapsulating in the selected digital signal processor the coder-decoder data frame to obtain data in the packet data format; and
    converting data from the packet data format to the telephony data format, comprising the steps of:
    receiving data in the packet data format;
    accumulating in digital logic hardware the data to obtain a packet data frame;
    resequencing in digital logic hardware the packet data frame to obtain a coder-decoder data frame;
    selecting in digital logic hardware a digital signal processor from an array of digital signal processors;
    passing the coder-decoder data frame to the selected digital signal processor;

decoding in the selected digital signal processor the coder-decoder frame to obtain a telephony data frame;

passing the telephony data frame to digital logic hardware; and encapsulating in digital logic hardware the telephony data frame to obtain data in the telephony data format;

wherein converting data from the packet data format to the telephony data format comprises removing in digital logic hardware jitter from the coder-decoder data frame.

11. A method as claimed in claim 10, wherein receiving data in the telephony data format comprises receiving from a hybrid switch data to be converted from the telephony data format to the packet data format, and wherein receiving data in the packet data format comprises receiving from said hybrid switch data to be converted from the packet data format to the telephony data format.

12. A transcoder as claimed in claim 10, wherein said array is a two-dimensional array, wherein said two-dimensional array comprises a plurality of rows of digital signal processors and a plurality of columns of digital signal processors.

13. A method for converting data between a telephony data format and a packet data format, comprising the steps of:

converting data from the telephony data format to the packet data format, comprising the steps of:
receiving data in the telephony data format;
accumulating in digital logic hardware the data to obtain a telephony data frame;
selecting in digital logic hardware a digital signal processor from an array of digital signal processors;
passing the telephony data frame to the selected digital signal processor;
transcoding in the selected digital signal processor the telephony data frame to obtain a coder-decoder data frame; and
encapsulating in the selected digital signal processor the coder-decoder data frame to obtain data in the packet data format; and converting data from the packet data format to the telephony data format, comprising the steps of:
receiving data in the packet data format;
accumulating in digital logic hardware the data to obtain a packet data frame;
resequencing in digital logic hardware the packet data frame to obtain a coder-decoder data frame;
selecting in digital logic hardware a digital signal processor from an array of digital signal processors;
passing the coder-decoder data frame to the selected digital signal processor;
decoding in the selected digital signal processor the coder-decoder frame to obtain a telephony data frame;
passing the telephony data frame to digital logic hardware; and
encapsulating in digital logic hardware the telephony data frame to obtain data in the telephony data format;
wherein converting data from the packet data format to the telephony data format comprises removing in the selected digital signal processor jitter from the coder-decoder data frame.

14. A method as claimed in claim 13, wherein receiving data in the telephony data format comprises receiving from a hybrid switch data to be converted from the telephony data format to the packet data format, and wherein receiving data in the packet data format comprises receiving from said hybrid switch data to be converted from the packet data format to the telephony data format.

15. A transcoder as claimed in claim 13, wherein said array is a two-dimensional array, wherein said two-dimensional array comprises a plurality of rows of digital signal processors and a plurality of columns of digital signal processors.

16. A transcoder to convert data between a telephony data format and a packet data format, comprising:

a digital logic telephony data engine to receive telephony data for said transcoder and to transmit telephony data for said transcoder, said digital logic telephony data engine comprising a frame accumulation buffer;

a digital logic packet engine to receive packet data for said transcoder and to transmit packet data for said transcoder;

a digital signal processing complex coupled to said digital logic telephony data engine and said digital logic packet engine, said digital signal processing complex comprising an array of digital signal processors; and a host processor coupled to said digital logic telephony data engine and said digital logic packet engine, wherein said digital logic telephony data engine, said digital logic packet engine, and said digital signal processing complex separate media channels from control channels in input data, direct the control channels to the host processor, and perform media channel processing, wherein said host processor performs control channel processing;

wherein data is converted from the packet data format to the telephony data format by removing jitter from a coder-decoder data frame, said coder-decoder data frame based on said packet data.

17. A transcoder as claimed in claim 16, wherein the digital logic packet engine further comprises a jitter buffer.

18. A transcoder as claimed in claim 16, wherein the digital signal processing complex further comprises a jitter buffer.

19. A transcoder as claimed in claim 16, wherein said array is a two-dimensional array, wherein said two-dimensional array comprises a plurality of rows of digital signal processors and a plurality of columns of digital signal processors.

20. A system to connect a telephone network and a packet network, comprising:

a hybrid switch coupled to said telephone and packet networks to switch data between said telephone and packet networks; and at least one transcoder coupled to said hybrid switch to convert data between a telephony data format used by said telephone network and a packet data format used by said packet network, each said transcoder comprising:

a digital logic telephony data engine to receive telephony data for said transcoder and to transmit telephony data for said transcoder, said digital logic telephony data engine comprising a frame accumulation buffer;

a digital logic packet engine to receive packet data for said transcoder and to transmit packet data for said transcoder;

a digital signal processing complex coupled to said digital logic telephony data engine and said digital logic packet engine, said digital signal processing complex comprising an array of digital signal processors; and a host processor coupled to said digital logic telephony data engine and said digital logic packet engine, wherein said digital logic telephony data engine, said digital logic packet engine, and said digital signal processing complex separate media channels from control channels in input data, direct the control channels to the host processor, and perform media channel processing, wherein said host processor performs control channel processing;

wherein data is converted from the packet data format to the telephony data format by removing jitter from a coder-decoder data frame, said coder-decoder data frame based on said packet data.

* * * * *